(12) United States Patent
Zhang et al.

(10) Patent No.: US 12,352,726 B2
(45) Date of Patent: Jul. 8, 2025

(54) TRACE DETECTION DEVICE

(71) Applicants: Nuctech Company Limited, Beijing (CN); Tsinghua University, Beijing (CN)

(72) Inventors: Qingjun Zhang, Beijing (CN); Yuanjing Li, Beijing (CN); Zhiqiang Chen, Beijing (CN); Jianmin Li, Beijing (CN); Weiping Zhu, Beijing (CN); Qiufeng Ma, Beijing (CN); Biao Cao, Beijing (CN); Lili Yan, Beijing (CN); Ge Li, Beijing (CN); Nei Yang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 321 days.

(21) Appl. No.: 17/999,201

(22) PCT Filed: May 14, 2021

(86) PCT No.: PCT/CN2021/093720
§ 371 (c)(1),
(2) Date: Nov. 17, 2022

(87) PCT Pub. No.: WO2021/233210
PCT Pub. Date: Nov. 25, 2021

(65) Prior Publication Data
US 2023/0236150 A1 Jul. 27, 2023

(30) Foreign Application Priority Data
May 18, 2020 (CN) .......................... 202010416806.4

(51) Int. Cl.
| G01N 27/622 | (2021.01) |
| G01N 30/20 | (2006.01) |
| G01N 30/02 | (2006.01) |

(52) U.S. Cl.
CPC .......... *G01N 27/622* (2013.01); *G01N 30/20* (2013.01); *G01N 2030/025* (2013.01); *G01N 2030/201* (2013.01)

(58) Field of Classification Search
CPC .. G01N 27/622; G01N 30/20; G01N 30/7206; G01N 30/02; G01N 30/16; G01N 2030/025; G01N 2030/201
See application file for complete search history.

(56) References Cited

U.S. PATENT DOCUMENTS

| 5,811,059 A | 9/1998 | Genovese et al. |
| 2004/0031919 A1 | 2/2004 | Leonhardt et al. |

(Continued)

FOREIGN PATENT DOCUMENTS

| CN | 201917559 U | 8/2011 |
| CN | 104569233 A | 4/2015 |

(Continued)

OTHER PUBLICATIONS

Cheng et al., "A novel gas chromatography detector based on ion mobility spectrometry technology and its application", Chinese Journal of Chromatography, 29(9): 901-907 (2011).

(Continued)

*Primary Examiner* — Suman K Nath
(74) *Attorney, Agent, or Firm* — Knobbe, Martens, Olson & Bear, LLP

(57) ABSTRACT

A trace detection device including: an ion mobility tube; a sampling gas path module; a sample injection gas path module configured to introduce a sample carrier gas containing a sample collected by the sampling gas path module (Continued)

toward the ion mobility tube; and a gas chromatography apparatus capable of pre-separating the sample carrier gas, so as to form a pre-separated sample carrier gas; wherein the sample injection gas path module is further configured to be capable of switching between a first mode and a second mode, in the first mode, the sample injection gas path module introduces the sample carrier gas into the ion mobility tube; and in the second mode, the sample injection gas path module introduces the sample carrier gas into the gas chromatography apparatus to pre-separate the sample carrier gas, and the pre-separated sample carrier gas is introduced into the ion mobility tube.

14 Claims, 6 Drawing Sheets

(56) References Cited

U.S. PATENT DOCUMENTS

| | | | |
|---|---|---|---|
| 2007/0029477 | A1 | 2/2007 | Miller et al. |
| 2015/0115151 | A1 | 4/2015 | Verenchikov |
| 2016/0003774 | A1 | 1/2016 | Nacson et al. |
| 2018/0266927 | A1* | 9/2018 | Kirkby ............. G01N 1/22 |
| 2019/0107517 | A1* | 4/2019 | Zhou .............. G01N 30/14 |
| 2019/0193017 | A1* | 6/2019 | Zhang ............. B01D 53/0446 |

FOREIGN PATENT DOCUMENTS

| | | |
|---|---|---|
| CN | 104956215 A | 9/2015 |
| CN | 105259246 A | 1/2016 |
| CN | 105277577 A | 1/2016 |
| CN | 105319284 A | 2/2016 |
| CN | 105849551 A | 8/2016 |
| CN | 106645472 A | 5/2017 |
| CN | 107907622 A | 4/2018 |
| CN | 108008054 A | 5/2018 |
| CN | 108845054 A | 11/2018 |
| CN | 109307724 A | 2/2019 |
| CN | 109521081 A | 3/2019 |
| CN | 109781867 A | 5/2019 |
| CN | 209559837 U | 10/2019 |
| CN | 110880445 A | 3/2020 |
| CN | 110988208 A | 4/2020 |
| CN | 111337598 A | 6/2020 |
| CN | 112563114 A | 3/2021 |
| EP | 3101418 A1 | 12/2016 |
| WO | WO 1999/041601 A1 | 8/1999 |
| WO | WO 2011/157781 A1 | 12/2011 |
| WO | WO 2018/103438 A1 | 6/2018 |

OTHER PUBLICATIONS

Cook et al., "Using Gas Chromatography with Ion Mobility Spectrometry to Resolve Explosive Compounds in the Presence of Interferents", Journal of Forensic Sciences, 55(6): 1582-1591 (2010).

Debono et al., "Separation of mixtures using gas chromatography coupled to ion mobility spectrometry", International Journal for Ion Mobility Spectrometry, 5(2): 194-201 (2002).

Fuche et al., "The use of IMS and GC/IMS for analysis of Saliva", International Journal for Ion Mobility Spectrometry, 4(1): 20-25 (2001).

Haley et al., "GC-IMS: a technology for many applications", Proceedings of SPIE, vol. 3575, pp. 375-383 (1998).

International Search Report and Written Opinion issued in International Application No. PCT/CN2021/093720, mailed on Aug. 13, 2021.

Kanu et al., "Ion mobility spectrometry detection for gas chromatography", Journal of Chromatography A, vol. 1177, pp. 12-27 (2008).

Kwan et al., "Chemical Agent Detection Using GC-IMS: A Comparative Study", IEEE Sensors Journal, 10(3): 451-460 (2010).

Leonhardt, J. W., A new ppb-gas analyzer by means of GC-ion mobility spectrometry (GC-IMS), Journal of Radioanalytical and Nuclear Chemistry, 257(1): 133-139 (2003).

Office Action issued in Chinese Application No. 202010416806.4, dated Jul. 2, 2020.

Vautz et al., "On the potential of ion mobility spectrometry coupled to GC pre-separation—A tutorial", Analytica Chimica Acta, vol. 1024, pp. 52-64 (2018).

Witkiewicz et al., "Coupling Gas Chromatography with Ion Mobility Spectrometry", LC GC Europe, 29(6): 294-303 (2016).

Yang et al., "Research of gas chromatography-Ion mobility spectrometry", Modern Instruments & Medical Treatment, 20(3): 20-24 (2014).

* cited by examiner

TRACE DETECTION DEVICE

CROSS REFERENCE TO RELATED APPLICATION(S)

This application is a Section 371 National Stage Application of International Application No. PCT/CN2021/093720, filed on May 14, 2021, entitled "TRACE DETECTION DEVICE", which claims priority to Chinese patent Application No. 202010416806.4, filed on May 18, 2020, the entire contents of which are incorporated herein in their entireties by reference.

TECHNICAL FIELD

The present disclosure relates to a field of detection technology, and in particular to a trace detection device.

BACKGROUND

A combined technology of gas chromatography-ion mobility spectrometry not only effectively utilizes an outstanding separation ability of gas chromatography for a complex sample, but also effectively utilizes a high sensitivity of an ion mobility spectrometry device. The combined technology of gas chromatography-ion mobility spectrometry may not only solve problems of a low discrimination ability of a gas chromatography apparatus and a low cross-sensitivity and low resolution of the ion mobility spectrometry device in a detection of a mixture, but may also acquire chromatographic retention time information. Correspondingly, the combined technology of gas chromatography-ion mobility spectrometry may effectively perform an accurate discrimination and a simple quantification to a sample having complex components. Therefore, this technology is very suitable for detection and early warning of toxic and harmful gases and other prohibited items in a complex environment.

However, the existing combined technology of gas chromatography-ion mobility spectrometry either has a poor discrimination ability to the complex components or takes a long time for detection. As a result, the existing combined technology of gas chromatography-ion mobility spectrometry is difficult to meet the need of a rapid detection and the need of an accurate detection for a complex object to be detected in a complex on-site detection environment at the same time.

SUMMARY

According to the embodiments of the present disclosure, there is provided a trace detection device, including: an ion mobility tube configured to detect a sample; a sampling gas path module configured to collect a sample; a sample injection gas path module configured to introduce a sample carrier gas containing the sample collected by the sampling gas path module toward the ion mobility tube; and a gas chromatography apparatus capable of pre-separating the sample carrier gas, so as to form a pre-separated sample carrier gas; wherein the sample injection gas path module is further configured to be capable of switching between a first mode and a second mode, in the first mode, the sample injection gas path module introduces the sample carrier gas into the ion mobility tube; and in the second mode, the sample injection gas path module introduces the sample carrier gas into the gas chromatography apparatus to pre-separate the sample carrier gas, and the pre-separated sample carrier gas is introduced into the ion mobility tube.

In some embodiments, the sample injection gas path module includes a main sample injection gas path module as well as a first branch sample injection gas path module and a second branch sample injection gas path module in parallel connection, the first branch sample injection gas path module and the second branch sample injection gas path module in parallel connection are connected with the main sample injection gas path module in series, and the gas chromatography apparatus is disposed on the second branch sample injection gas path module; and the trace detection device further includes a first three-way valve, a first port of the first three-way valve is in fluid communication with the main sample injection gas path module, a second port of the first three-way valve is in fluid communication with the first branch sample injection gas path module, a third port of the first three-way valve is in fluid communication with the second branch sample injection gas path module, and the first three-way valve is configured to only allow the sample carrier gas to flow from the main sample injection gas path module to the first branch sample injection gas path module in the first mode, and only allow the sample carrier gas to flow from the main sample injection gas path module to the second branch sample injection gas path module in the second mode.

In some embodiments, the trace detection device further includes a pressurized gas path module configured to introduce a pressurized gas to an upstream side of the second branch sample injection gas path module.

In some embodiments, an inlet end of the pressurized gas path module is in fluid communication with a portion of the main sample injection gas path module located on an upstream side of the sampling gas path module, so as to receive a gas from the main sample injection gas path module for use as the pressurized gas.

In some embodiments, the trace detection device further includes a pump for driving a discharge gas from the ion mobility tube into the pressurized gas path module.

In some embodiments, the sampling gas path module includes a sampling head and a sampling tube, the trace detection device further includes a fourth three-way valve, a first port of the fourth three-way valve is in fluid communication with an inlet of the sampling tube, a second port of the fourth three-way valve is in fluid communication with the main sample injection gas path module, a third port of the fourth three-way valve is in fluid communication with the sampling head, and the fourth three-way valve is configured to only allow a gas to flow from the sampling head to the sampling tube in a sampling state, and only allow a gas to flow from the main sample injection gas path module to the sampling tube in a sample injection state.

In some embodiments, the fourth three-way valve and the first three-way valve are two-position three-way solenoid valves.

In some embodiments, the sampling head includes a needle shape and a suction cup shape.

In some embodiments, the trace detection device further includes an air suction cleaning gas path module, wherein an inlet end of the air suction cleaning gas path module is in fluid communication with an outlet of the sampling tube, an outlet end of the air suction cleaning gas path module is in fluid communication with an external environment, a first purification filter is disposed on the air suction cleaning gas path module, and the air suction cleaning gas path module is configured to suck air in the external environment in an air suction cleaning state, the air passing through the sampling head and the sampling tube in sequence, followed by being filtered by the first purification filter and being discharged.

In some embodiments, the trace detection device further includes an air blowing cleaning gas path module, wherein an inlet end of the air blowing cleaning gas path module is in fluid communication with the external environment, an outlet end of the air blowing cleaning gas path module is in fluid communication with the outlet of the sampling tube, a second purification filter is disposed on the air blowing cleaning gas path module, and the air blowing cleaning gas path module is configured to make, in an air blowing cleaning state, the air from the external environment pass through the sampling tube and the sampling head in sequence after being filtered by the second purification filter, followed by being discharged.

In some embodiments, the trace detection device further includes a second three-way valve, a first port of the second three-way valve is in fluid communication with the outlet of the sampling tube, a second port of the second three-way valve is in fluid communication with the main sample injection gas path module, a third port of the second three-way valve is in fluid communication with the inlet end of the air suction cleaning gas path module and the outlet end of the air blowing cleaning gas path module, and the second three-way valve is configured to only allow a gas to flow from the sampling tube to the air suction cleaning gas path module in the air suction cleaning state or only allow a gas to flow from the air blowing cleaning gas path module to the sampling tube in the air blowing cleaning state, and only allow a gas to flow from the sampling tube to the main sample injection gas path module in the sample injection state.

In some embodiments, the trace detection device further includes a third three-way valve, wherein a first port of the third three-way valve is in fluid communication with the second port of the second three-way valve, a second port of the third three-way valve is in fluid communication with an inlet end of the first purification filter, a third port of the third three-way valve is in fluid communication with an outlet end of the second purification filter, and the third three-way valve is configured to only allow a gas from the sampling tube to flow to the first purification filter in the air suction cleaning state, and only allow a gas to flow from the second purification filter to the sampling tube in the air blowing cleaning state.

In some embodiments, the trace detection device further includes a circulation gas path module, wherein the circulation gas path module includes a mobility gas circulation gas path module and a carrier gas circulation gas path module, an inlet end of the mobility gas circulation gas path module is in fluid communication with a gas outlet of the ion mobility tube, an outlet end of the mobility gas circulation gas path module is in fluid communication with a third inlet of the ion mobility tube for introducing a mobility gas into the ion mobility tube, an inlet end of the carrier gas circulation gas path module is in fluid communication with the gas outlet of the ion mobility tube, and an outlet end of the carrier gas circulation gas path module is in fluid communication with a second inlet of the ion mobility tube for introducing a carrier gas into the ion mobility tube.

In some embodiments, a flow control valve is disposed on the mobility gas circulation gas path module for controlling a gas flow on the mobility gas circulation gas path module; and a flow control valve is also disposed on the carrier gas circulation gas path module for controlling a gas flow on the carrier gas circulation gas path module.

In some embodiments, the trace detection device includes a calibration gas path module, wherein one end of the calibration gas path module is in fluid communication with the carrier gas circulation gas path module; a calibration object box is disposed on the other end of the calibration gas path module, and the calibration object box is configured to accommodate a calibration object; and an on-off valve is further disposed on the calibration gas path module, and the on-off valve is configured to control an on-off of the calibration gas path module, so that in a calibration state, the carrier gas in the carrier gas circulation gas path module introduces a calibration object permeated from the calibration object box into the ion mobility tube to acquire calibration data.

DETAILED DESCRIPTION OF EMBODIMENTS

The present disclosure will be fully described with reference to accompanying drawings containing preferred embodiments of the present disclosure, but prior to this description it should be understood that those of ordinary skill in the art may modify the disclosure described herein and at the same time obtain technical effects of the present disclosure. Therefore, it is necessary to be understood that the above description is a broad disclosure to those of ordinary skill in the art and that the content of the above description is not intended to limit the exemplary embodiments described in the present disclosure.

Additionally, in the following detailed description, for convenience of explanation, numerous specific details are set forth in order to provide a thorough understanding of embodiments of the present disclosure. However, it is obvious that one or more embodiments may also be implemented without these specific details. In other circumstances, well-known structures and devices are shown in a form of diagram to simplify the drawings.

It should be noted that the term "fluid communication" used in the present disclosure not only includes a situation that the two are directly connected, but also includes a situation that a gas may be in fluid communication between the two through another intermediate pipeline or element.

According to a general inventive concept of the present disclosure, there is provided a trace detection device, including: an ion mobility tube configured to detect a sample; a sampling gas path module configured to collect a sample; a sample injection gas path module configured to introduce a sample carrier gas containing the sample collected by the sampling gas path module toward the ion mobility tube; and a gas chromatography apparatus capable of pre-separating the sample carrier gas, so as to form a pre-separated sample carrier gas; wherein the sample injection gas path module is further configured to be capable of switching between a first mode and a second mode, in the first mode, the sample injection gas path module introduces the sample carrier gas into the ion mobility tube; and in the second mode, the sample injection gas path module introduces the sample carrier gas into the gas chromatography apparatus to pre-separate the sample carrier gas, and the pre-separated sample carrier gas is introduced into the ion mobility tube.

According to the present disclosure, by switching the sample injection gas path module between the first mode and the second mode, a user may switch to the first mode (i.e., a quick detection mode) when a quick qualitative detection of a suspect is desired, and the user may switch to the second mode (i.e., a fine detection mode) when a deep judgement of a specific property of the suspect is desired. In this way, the user may select the needed detection mode as required, so as to meet various detection needs of a complex on-site detection environment and a complex detected target.

Figure 1:
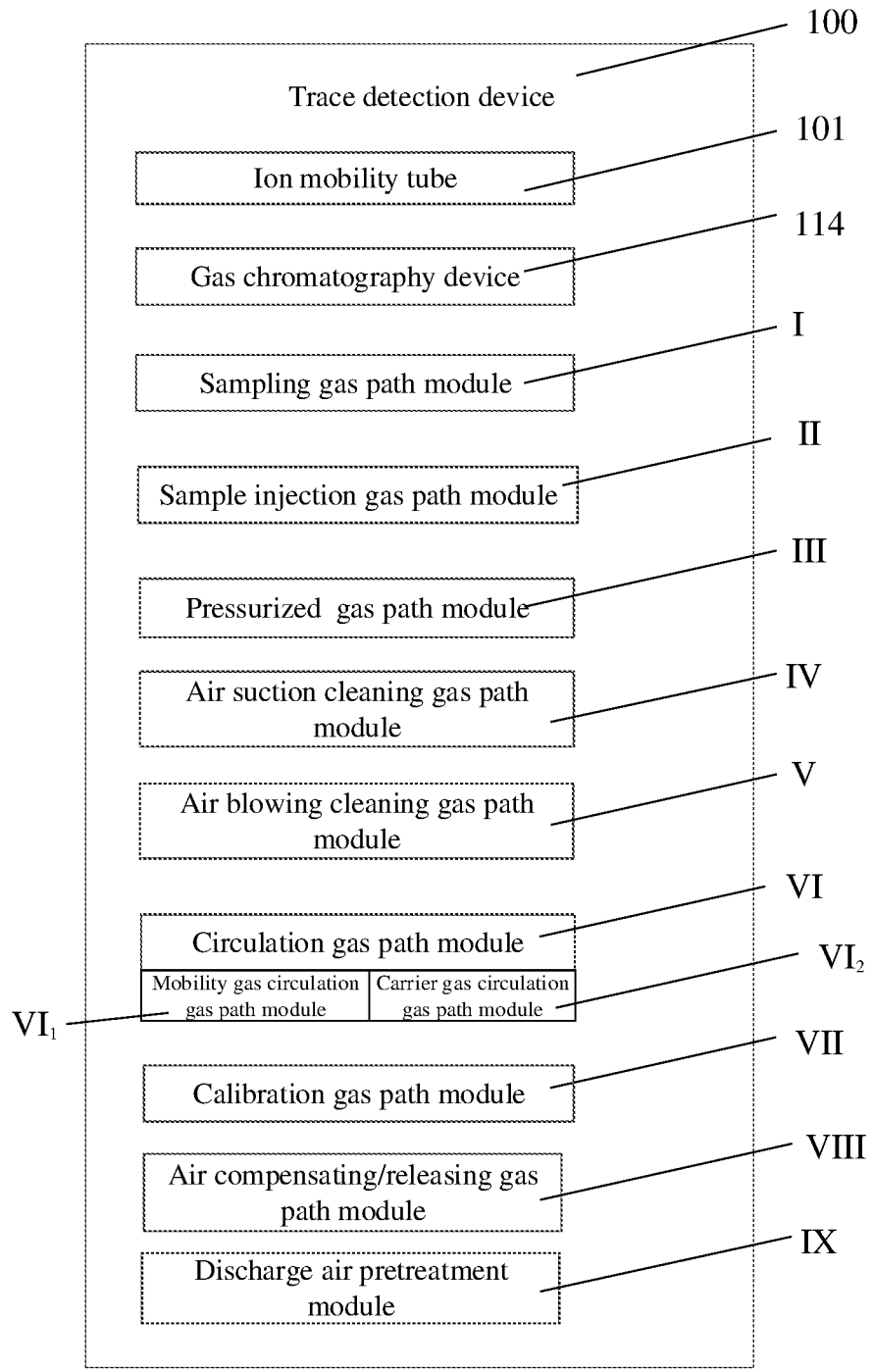
FIG. 1 is a schematic diagram of a trace detection device according to an embodiment of the present disclosure.
Figure 2:
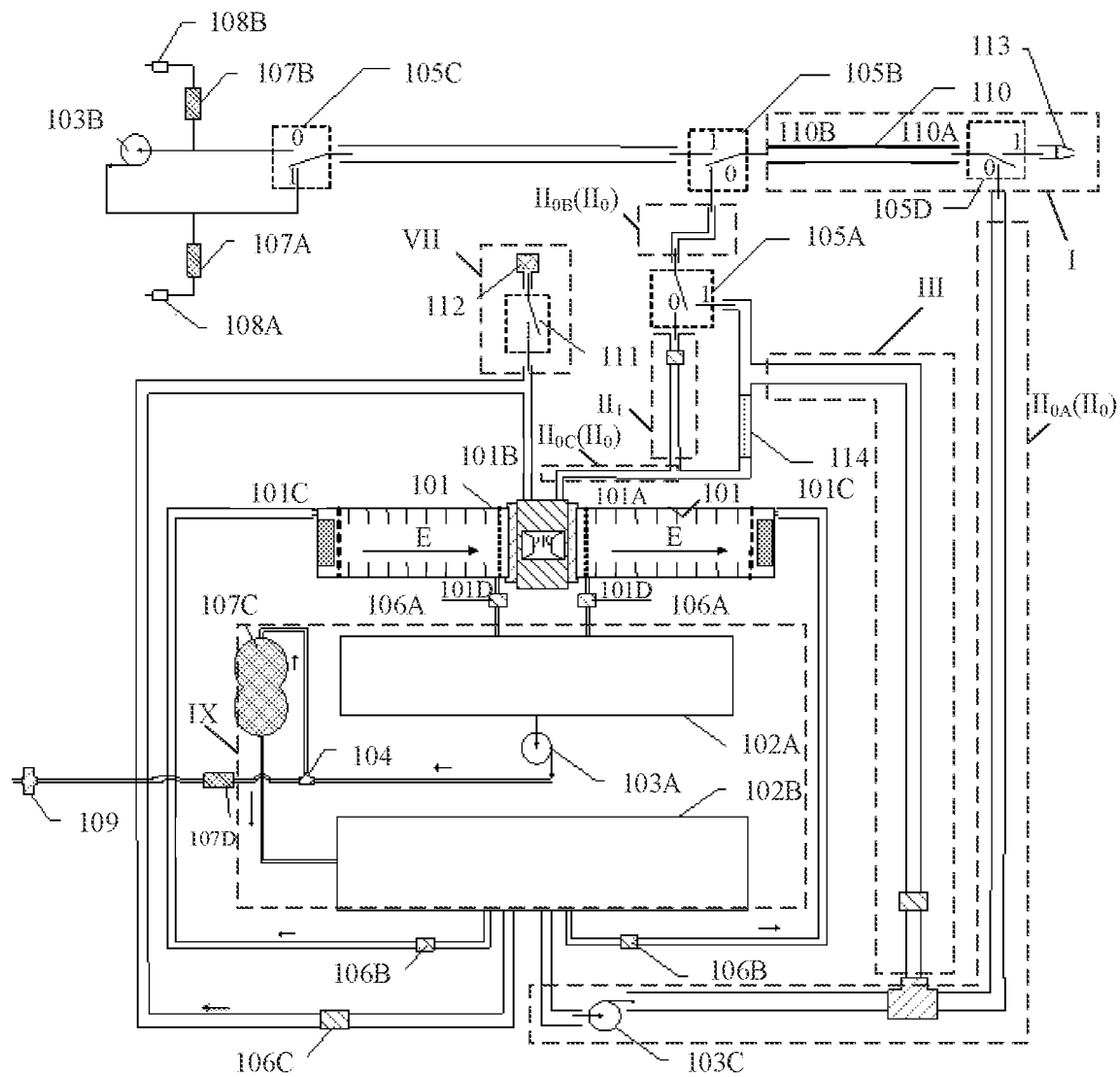
FIG. 2 is a schematic structural diagram of a trace detection device in an internal circulation state according to an embodiment of the present disclosure.
Figure 3:
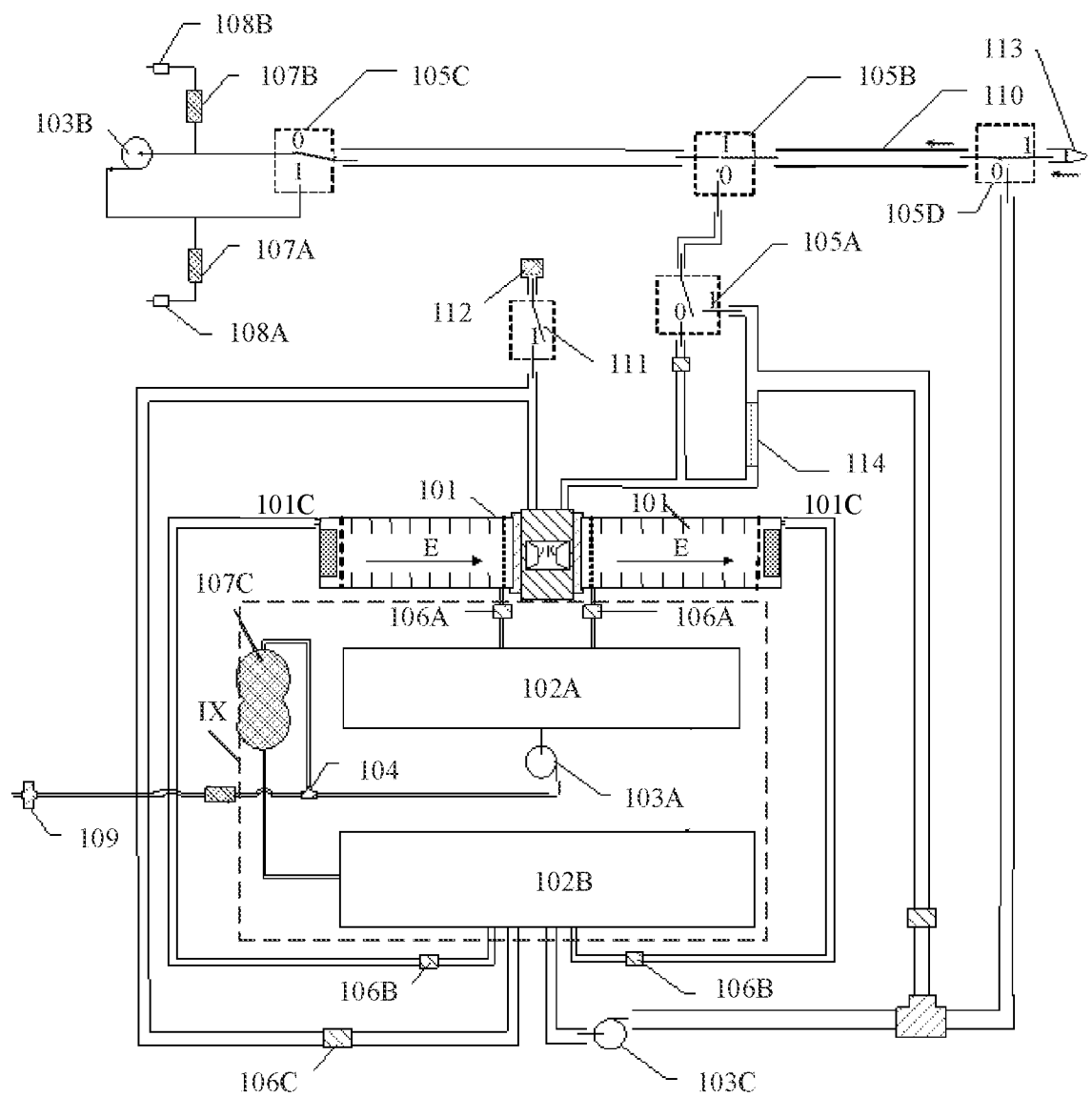
FIG. 3 is a schematic structural diagram of a trace detection device in a sampling state according to an embodiment of the present disclosure.
Figure 4:
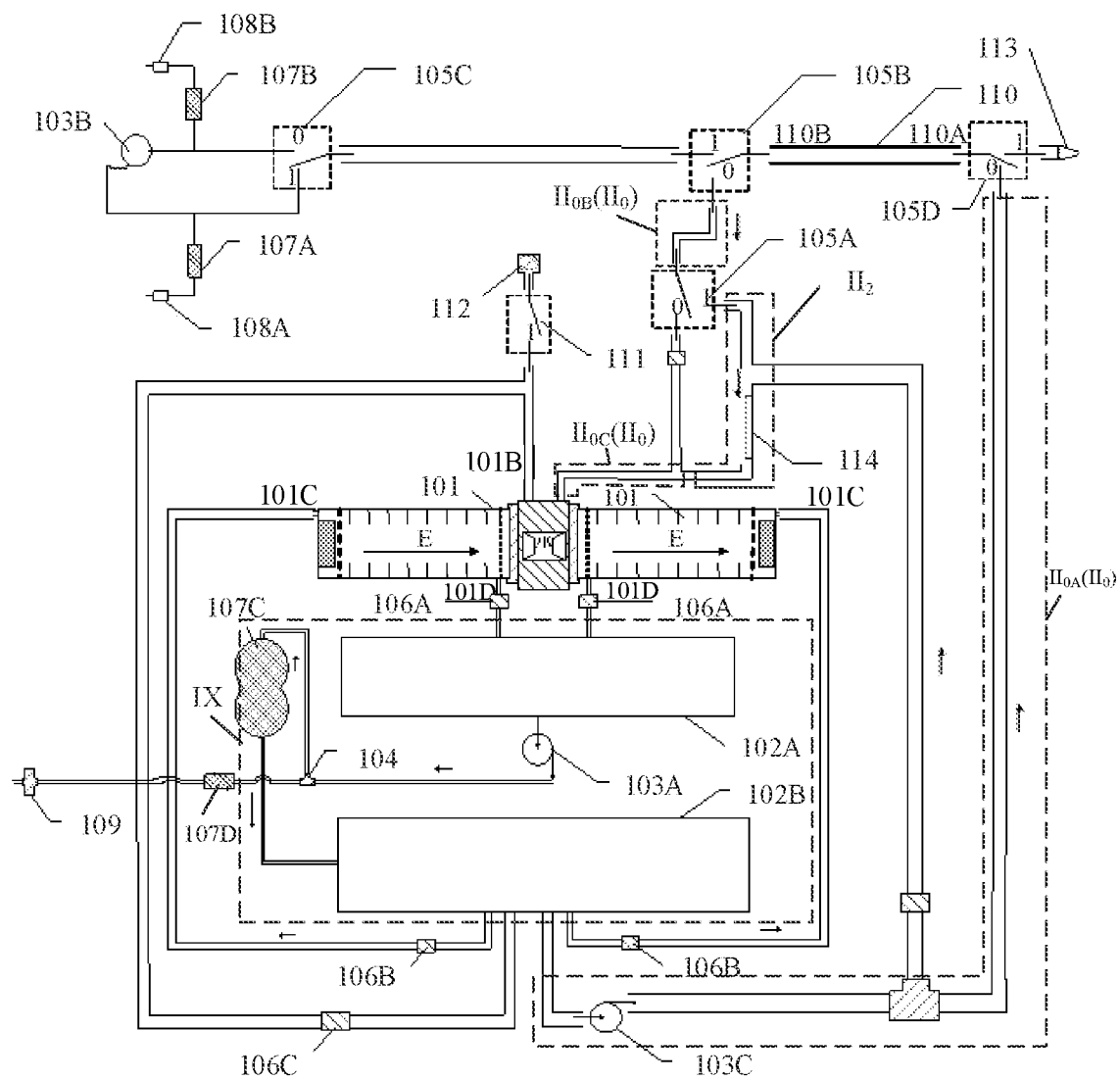
FIG. 4 is a schematic structural diagram of a trace detection device in a sample injection state according to an embodiment of the present disclosure.
Figure 5:
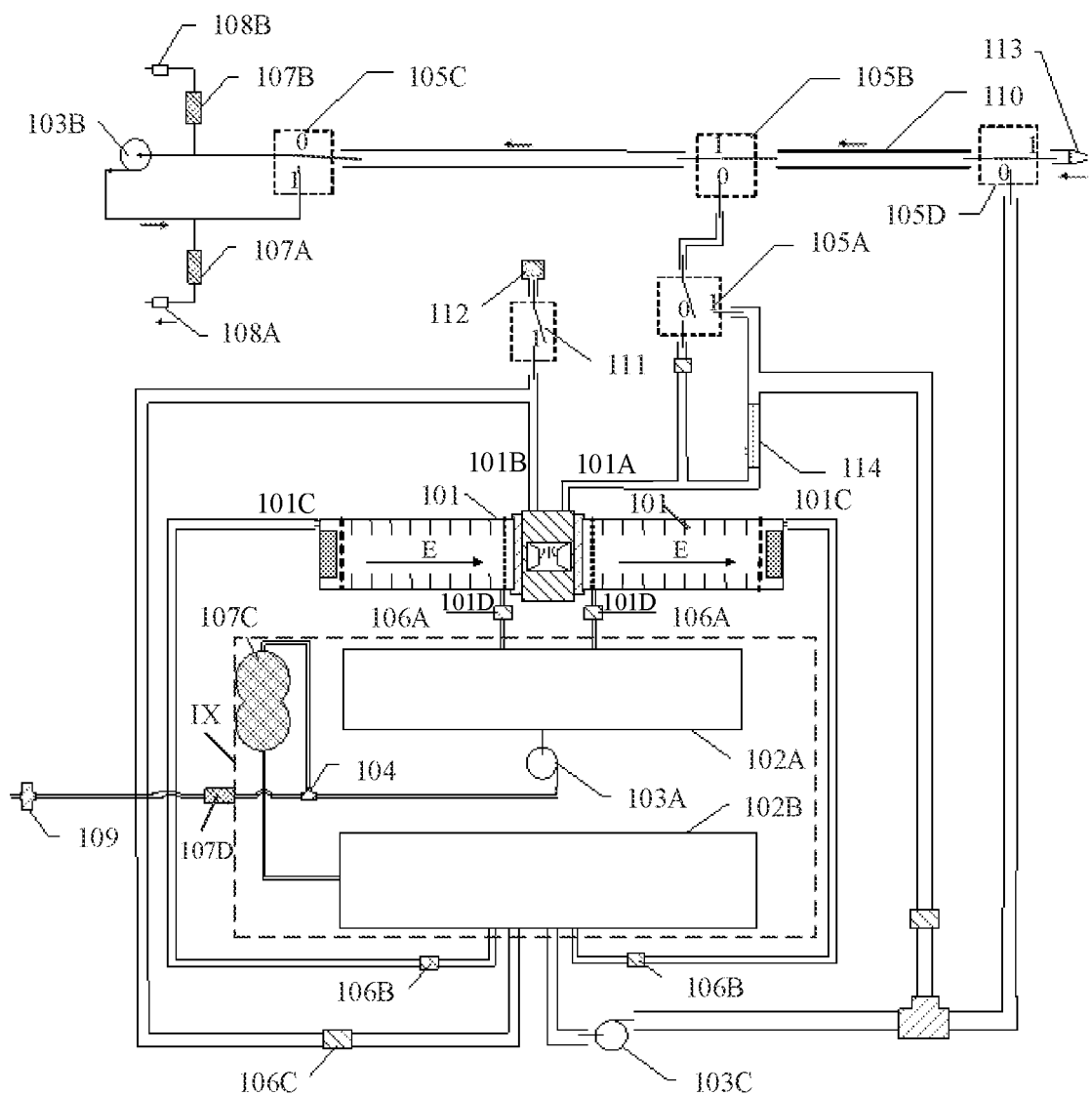
FIG. 5 is a schematic structural diagram of a trace detection device in an air suction cleaning state according to an embodiment of the present disclosure.
Figure 6:
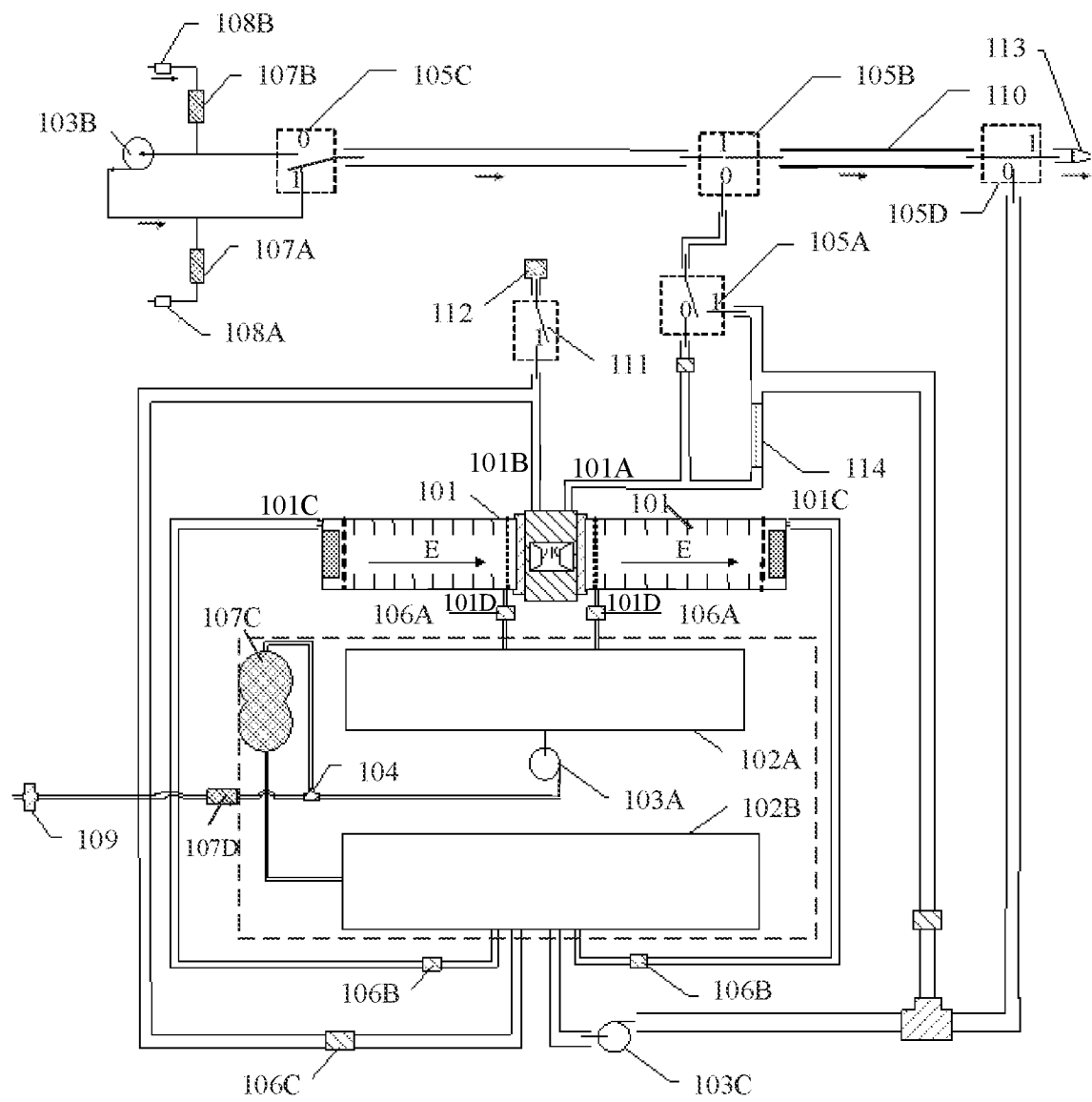
FIG. 6 is a schematic structural diagram of a trace detection device in an air blowing cleaning state according to an embodiment of the present disclosure.

FIG. 1 is a schematic diagram of a trace detection device 100 according to an embodiment of the present disclosure. FIG. 2 is a schematic structural diagram of a trace detection device in an internal circulation state according to an embodiment of the present disclosure. FIG. 3 is a schematic structural diagram of a trace detection device in a sampling state according to an embodiment of the present disclosure. FIG. 4 is a schematic structural diagram of a trace detection device in a sample injection state according to an embodiment of the present disclosure. FIG. 5 is a schematic structural diagram of a trace detection device in an air suction cleaning state according to an embodiment of the present disclosure. FIG. 6 is a schematic structural diagram of a trace detection device in an air blowing cleaning state according to an embodiment of the present disclosure.

As shown in FIG. 1, the trace detection device 100 includes an ion mobility tube 101, a gas chromatography apparatus 114, a sampling gas path module I, a sample injection gas path module II, a pressurized gas path module III, an air suction cleaning gas path module IV, an air blowing cleaning gas path module V, a circulation gas path module VI, a calibration gas path module VII, an air compensating/releasing gas path module VIII, and a discharge gas pretreatment module IX.

As shown in FIG. 1 and FIG. 2, the ion mobility tube 101 is configured to detect a sample. A first inlet 101A, a second inlet 101B, a third inlet 101C, and an outlet 101D are disposed on the ion mobility tube 101. A sample carrier gas containing the sample enters the ion mobility tube 101 via the first inlet 101A. A gas in the ion mobility tube 101 flows out via the outlet 101D. A portion of the gas flowing out from the ion mobility tube 101 is used as a carrier gas and returns to the ion mobility tube 101 via the second inlet 101B, and a portion of the gas flowing out from the ion mobility tube 101 is used as a mobility gas and returns to the ion mobility tube 101 via the third inlet 101C.

As shown in FIG. 2, the sampling gas path module I includes a sampling head 113 and a sampling tube 110. The sampling head 113 is configured to collect a sample, and the sampling tube 110 is configured to temporarily store the sample collected by the sampling head 113. A shape of the sampling head 113 includes, but is not limited to, a needle shape (for example, for use in a travel bag and luggage), a suction cup shape (for example, for use in a container ventilator), or any other shape known or applicable in the art.

In this way, the user may make a selection according to a condition of an object to be detected, so as to improve an adaptability of the trace detection device 100. The trace detection device 100 further includes a second pump 103B. The second pump is used to drive the sample collected by the sampling head 113 into the sampling tube 110 in the sampling state. The second pump 103B is preferably a diaphragm pump.

As shown in FIG. 2 and FIG. 4, an inlet end of the sample injection gas path module II is in fluid communication with the outlet 101D of the ion mobility tube 101 via the discharge gas pretreatment module IX. An outlet end of the sample injection gas path module II is in fluid communication with the first inlet 101A of the ion mobility tube 101. Moreover, the sample injection gas path module II is configured to introduce a purified discharge gas from the ion mobility tube 101 into the sampling tube 110, so as to form a sample carrier gas containing the sample with the sample temporarily stored in the sampling tube 110, and introduce the sample carrier gas into the ion mobility tube 101.

As shown in FIG. 2 and FIG. 4, the sample injection gas path module II includes a main sample injection gas path module $II_0$, a first branch sample injection gas path module $II_1$ and a second branch sample injection gas path module $II_2$ in parallel connection. In this exemplary embodiment, the main sample injection gas path module $II_0$ includes a first portion $II_{0A}$, a second portion $II_{0B}$ and a third portion $II_{0C}$. An inlet end of the first portion $II_{0A}$ is in fluid communication with the outlet 101D of the ion mobility tube 101 via the discharge gas pretreatment module IV, and an outlet end of the first portion $II_{0A}$ is in fluid communication with an inlet 110A of the sampling tube 110 via a fourth three-way valve 105D (e.g., a two-position three-way solenoid valve) for introducing the purified discharge gas from the ion mobility tube 101 into the sampling tube 110, so as to form the sample carrier gas containing the sample with the sample temporarily stored in the sampling tube 110. An inlet end of the second portion $II_{0B}$ is in fluid communication with an outlet 110B of the sampling tube 110 via a second three-way valve (e.g., a two-position three-way solenoid valve) 105B. The trace detection device 100 further includes a first three-way valve 105A (e.g., a two-position three-way solenoid valve). A first port of the first three-way valve 105A is in fluid communication with an outlet end of the second portion $II_{0B}$. A second port of the first three-way valve 105A is in fluid communication with an inlet end of the first branch sample injection gas path module $II_1$. A third port of the first three-way valve 105A is in fluid communication with an inlet end of the second branch sample injection gas path module $II_2$. The first three-way valve 105A is configured to only allow the sample carrier gas to flow from the second portion $II_{0B}$ of the main sample injection gas path module $II_0$ to the first branch sample injection gas path module $II_1$ in the first mode, and only allow the sample carrier gas to flow from the second portion $II_{0B}$ of the main sample injection gas path module $II_0$ to the second branch sample injection gas path module $II_2$ in the second mode. An outlet end of the first branch sample injection gas path module $II_1$ and an outlet end of the second branch sample injection gas path module $II_2$ are both in fluid communication with an inlet end of the third portion $II_{0C}$, and an outlet end of the third portion $II_{0C}$ is in fluid communication with the first inlet 101A of the ion mobility tube 101 for introducing a sample carrier gas from the first branch sample injection gas path module $II_1$ or the second branch sample injection gas path module $II_2$ into the ion mobility tube 101. That is, the first three-way valve 105A is used to achieve switching between the first mode and the second mode. The gas chromatography apparatus 114 is disposed on the second branch sample injection gas path module $II_2$ and is configured to pre-separate a sample carrier gas from the sampling tube 110. The pre-separated sample carrier gas is introduced into the ion mobility tube 101 via the third portion $II_{OC}$ of the main sample injection gas path module $II_0$.

It should be noted that those skilled in the art should understand that the gas chromatography apparatus 114 may include a chromatographic column and a heating jacket sheathed outside the chromatographic column. The chromatographic column may be, for example, a multi-capillary column with a high column efficiency and a high separation ability. Of course, the gas chromatography apparatus 114 may also use any alternative device known or applicable in the art. In addition, the outlet end of the first branch sample injection gas path module $II_1$ or the outlet end of the second branch sample injection gas path module $II_2$ may also be directly in fluid communication with the first inlet 101A of the ion mobility tube 101, or the first port of the first three-way valve 105A may also be directly in fluid communication with the outlet 110B of the sampling tube 110. That is, the main sample injection gas path module $II_0$ does not necessarily need to have the second portion $II_{OB}$ and the third portion $II_{OC}$.

In some embodiments, as shown in FIG. 2, a first port of the fourth three-way valve 105D is in fluid communication with the inlet 110A of the sampling tube 110. A second port of the fourth three-way valve 105D is in fluid communication with the outlet end of the first portion $II_{OA}$ of the main sample injection gas path module $II_0$. A third port of the fourth three-way valve 105D is in fluid communication with the sampling head 113. The fourth three-way valve 105D is configured to only allow a gas to flow from the sampling head 113 to the sampling tube 110 in the sampling state, and only allow a gas to flow from the first portion $II_{OA}$ of the main sample injection gas path module $II_0$ to the sampling tube 110 in the sample injection state.

In some embodiments, as shown in FIG. 2, the trace detection device 100 further includes the pressurized gas path module III. The pressurized gas path module III is configured to introduce a pressurized gas to an upstream side of the gas chromatograph device 114 of the second branch sample injection gas path module $II_2$ in a gas flow direction, so as to drive the sample carrier gas into the gas chromatograph device 114.

In some embodiments, as shown in FIG. 2 and FIG. 4, an inlet end of the pressurized gas path module III is in fluid communication with the first portion $II_{OA}$ of the main sample injection gas path module $II_0$, so as to receive a gas from the main sample injection gas path module $II_0$ for use as the pressurized gas.

In some embodiments, as shown in FIG. 2 to FIG. 6, the trace detection device 100 further includes a third pump 103C. The third pump 103C is disposed on the first portion $II_{OA}$ of the main sample injection gas path module $II_0$. The third pump 103C is located on an upstream side of a connection between the pressurized gas path module III and the first portion $II_{OA}$ of the main sample injection gas path module $II_0$ along the gas flow direction for driving the discharge gas from the ion mobility tube 101 to enter the pressurized gas path module III via the discharge gas pre-treatment module IX, so as to increase a pressure inside the pressurized gas path module III. The third pump 103C is preferably a diaphragm pump.

In some embodiments, as shown in FIG. 5, the trace detection device 100 further includes the air suction cleaning gas path module IV. An inlet end of the air suction cleaning gas path module IV is in fluid communication with the outlet 110B of the sampling tube 110 via the second three-way valve 105B. An outlet end of the air suction cleaning gas path module IV is in fluid communication with the external environment. A first purification filter 107A is disposed on the air suction cleaning gas path module IV. The air suction cleaning gas path module IV is configured to suck air in the external environment in the air suction cleaning state, the air passing through the sampling head 113 and the sampling tube 110 in sequence, followed by being filtered by the first purification filter 107A and being discharged, so as to achieve cleaning of passed pipelines and valves, and ensure that the discharged air will not adversely affect the external environment.

In some embodiments, as shown in FIG. 2 to FIG. 6, an air resistance 108A is further disposed on the air suction cleaning gas path module IV. The air resistance 108A is located downstream of the first purification filter 107A along the gas flow direction, so as to adjust a gas flow inside the air suction cleaning gas path module IV.

In some embodiments, as shown in FIG. 6, the trace detection device 100 further includes the air blowing cleaning gas path module V. An inlet end of the air blowing cleaning gas path module V is in fluid communication with the external environment. An outlet end of the air blowing cleaning gas path module V is in fluid communication with the outlet 110B of the sampling tube 110 via the second three-way valve 105B. A second purification filter 107B is further disposed on the air blowing cleaning gas path module V. The air blowing cleaning gas path module V is configured to make the air from the external environment enter the sampling tube 110 and the sampling head 113 in sequence after being filtered by the second purification filter 107B, and then be discharged in an air blowing cleaning state, so as to achieve cleaning of the passed pipelines and valves. In addition, the air in the external environment is first filtered by disposing the second purification filter 107B, so that the trace detection device 100 may cope with a relatively harsh environmental condition.

In some embodiments, as shown in FIG. 2 to FIG. 6, an air resistance 108B is further disposed on the air blowing cleaning gas path module V. The air resistance 108B is located on an upstream side of the second purification filter 107B along the gas flow direction, so as to adjust a gas flow inside the air blowing cleaning gas path module V.

In some embodiments, as shown in FIG. 2 to FIG. 6, the trace detection device 100 further includes a third three-way valve 105C. A first port of the third three-way valve 105C is in fluid communication with the outlet 101D of the sampling tube 110 via the second three-way valve 105B. A second port of the third three-way valve 105C is in fluid communication with an inlet end of the first purification filter 107A. A third port of the third three-way valve 105C is in fluid communication with an outlet end of the second purification filter 107B. The third three-way valve 105C is configured to only allow a gas from the sampling tube 110 to flow to the first purification filter 107A in the air suction cleaning state, and only allow a gas to flow from the second purification filter 107B to the sampling tube 110 in the air blowing cleaning state. By disposing the third three-way valve 105C, the air suction cleaning gas path module IV and the air blowing cleaning gas path module V may share some components to reduce the number of components and lower a manufacturing cost. For example, an end portion (i.e., the inlet end) where the air suction cleaning gas path module IV is connected with a third port of the second three-way valve 105B and an end portion (i.e., the outlet end) where the air blowing cleaning gas path module V is connected with the third port of the second three-way valve 105B are shared.

In some embodiments, as shown in FIG. 2 to FIG. 6, a first port of the second three-way valve 105B is in fluid communication with the outlet of the sampling tube 110. A second port of the second three-way valve 105B is in fluid communication with the inlet end of the second portion $II_{OB}$ of the main sample injection gas path module $II_O$. The third port of the second three-way valve 105B is in fluid communication with the inlet end of the air suction cleaning gas path module IV (the outlet end of the air blowing cleaning gas path module V). The second three-way valve 105B is configured to only allow a gas to flow from the outlet 110B of the sampling tube 110 to the air suction cleaning gas path module IV in the air suction cleaning state (or only allow a gas to flow from the air blowing cleaning gas path module V to the sampling tube 110 in the air blowing cleaning state), and only allow a gas to flow from the outlet 110B of the sampling tube 110 to the second portion $II_{OB}$ of the main sample injection gas path module $II_O$ in the sample injection state.

In some embodiments, as shown in FIG. 2 to FIG. 6, the second pump 103B is further configured to drive, in the air suction cleaning state, a gas to flow through the sampling tube 110, the first purification filter 107A and the air resistance 108A in sequence from the sampling head 113, and the gas is discharged from the air resistance 108A. The second pump 103B is further configured to drive, in the air blowing cleaning state, a gas to flow through the air resistance 108B, the second purification filter 107B, the sampling tube 110 and the sampling head 113 in sequence, and the gas is discharged from the sampling head 113. That is, the air suction cleaning gas path module IV, the air blowing cleaning gas path module V, and the sampling gas path module I share the second pump 103B to reduce the cost. It should be noted that those skilled in the art should understand that in some other embodiments of the present disclosure, pumps may be respectively disposed on the air suction cleaning gas path module IV, the air blowing cleaning gas path module V, and the sampling gas path module I.

In addition, the trace detection device 100 in this embodiment has both the air suction cleaning gas path module IV and the air blowing cleaning gas path module V. However, those skilled in the art should understand that in other embodiments of the present disclosure, only one of the air suction cleaning gas path module IV and the air blowing cleaning gas path module V may be disposed.

In some embodiments, as shown in FIG. 1 and FIG. 2, the trace detection device 100 further includes the circulation gas path module VI. The circulation gas path module VI includes a mobility gas circulation gas path module $VI_1$ and a carrier gas circulation gas path module $VI_2$. An inlet end of the mobility gas circulation gas path module $VI_1$ is in fluid communication with the outlet 101D of the ion mobility tube 101 via the discharge gas pretreatment module IX, and an outlet end of the mobility gas circulation gas path module $VI_1$ is in fluid communication with the third inlet 101C for introducing a mobility gas into a gas mobility zone of the ion mobility tube 101. An inlet end of the carrier gas circulation gas path module $VI_2$ is in fluid communication with the outlet 101D of the ion mobility tube 101 via the discharge gas pretreatment module IX, and an outlet end of the carrier gas circulation gas path module $VI_2$ is in fluid communication with the second inlet 101B for introducing a carrier gas into an ionization reaction zone of the ion mobility tube 101.

In this embodiment, the discharge gas pretreatment module IX is configured to pretreat a discharge gas from the ion mobility tube 101. The discharge gas pretreatment module IX includes a first pump 103A. The first pump 103A is located downstream of the ion mobility tube 101 in the gas flow direction and used to drive a flow of the gas throughout an entire system. The first pump 103A is preferably a diaphragm pump. The discharge gas pretreatment module IX further includes a first buffer chamber 102A located between the first pump 103A and the outlet 101D of the ion mobility tube 101 in the gas flow direction. The first buffer chamber 102A is used to reduce an influence of a pulsed airflow of the first pump 103A on a signal of the ion mobility tube 101. Further, the discharge gas pretreatment module IX further includes a second buffer chamber 102B located downstream of the first pump 103A in the gas flow direction, so as to further reduce the influence of the pulsed airflow of the first pump 103A on the signal of the ion mobility tube 101. The mobility gas circulation gas path module $VI_1$ and the carrier gas circulation gas path module $VI_2$ are respectively in communication with a gas discharge port of the second buffer chamber 102B. In an embodiment, a buffer film is disposed on at least a portion of at least one surface of the first buffer chamber 102A and the second buffer chamber 102B to enhance a buffer effect. In an embodiment, a buffer film with a good stretchability is used as the buffer film. A material of the buffer film includes but is not limited to latex.

As shown in FIG. 2, the discharge gas pretreatment module IX further includes a third purification filter 107C. The third purification filter 107C is located between the first pump 103A and the second buffer chamber 102B. The third purification filter 107C is used to filter the discharge gas discharged from the ion mobility tube 101.

As shown in FIG. 2, the trace detection device 100 further includes the calibration gas path module VII. One end of the calibration gas path module VII is in fluid communication with the carrier gas circulation gas path module $VI_2$. A calibration object box 112 is disposed at the other end of the calibration gas path module VII. The calibration object box 112 is used to accommodate a calibration object, such as a trace standard agent. An on-off valve 111 is further disposed on the calibration gas path module VII. The on-off valve 111 (such as a solenoid valve) is configured to control an on-off of the calibration gas path module, so that in a calibration state, the carrier gas in the carrier gas circulation gas path module $VI_2$ introduces a calibration object permeated from the calibration object box 112 into the ion mobility tube 101, so as to acquire calibration data, such as a peak position of a calibration peak and a calibration coefficient, thereby achieving a calibration of the trace detection device 100. The adaptability of the trace detection device 100 to the detection environment may be improved with the calibration gas path module VII.

As shown in FIG. 2, the trace detection device 100 further includes a first flow control valve (such as a solenoid valve) 106A. The first flow control valve 106A is located between the outlet 101D of the ion mobility tube 101 and the first buffer chamber 102A. The first flow control valve 106A is used to read a gas flow of the discharge gas from the ion mobility tube 101 and make a control. A second flow control valve (such as a solenoid valve) 106B is disposed on the mobility gas circulation gas path module $VI_1$. The second flow control valve 106B is used to read a gas flow of the mobility gas in the mobility gas circulation gas path module $VI_1$ and make a control. A third flow control valve 106C is disposed on the carrier gas circulation gas path module $VI_2$. The third flow control valve 106C is used to read a gas flow of the carrier gas in the carrier gas circulation gas path module VI$_2$ and make a control.

As shown in FIG. 2, the trace detection device 100 further includes the air compensating/releasing gas path module VIII for compensating air into the ion mobility tube 101 and releasing air in the ion mobility tube 101. One end of the air compensating/releasing gas path module VIII is in fluid communication with the outlet 101D of the ion mobility tube 101 via the first buffer chamber 102A. The other end of the air compensating/releasing gas path module VIII is in communication with the external environment. By disposing the air compensating/releasing gas path module VIII, the ion mobility tube 101 may automatically perform air compensation and air releasing according to changes in the environment, micro-sampling, and a temperature of the ion mobility tube 101 itself, thereby achieving quick sampling.

As shown in FIG. 2, a fourth purification filter 107D is disposed on the air compensating/releasing gas path module VIII. The fourth purification filter 107D is used to purify a gas flowing through the air compensating/releasing gas path module VIII.

As shown in FIG. 2, a water trap filter 109 is further disposed on the air compensating/releasing gas path module VIII. The water trap filter 109 is connected between the fourth purification filter 107D and the external environment, so as to further reduce an influence of the external environment on the ion mobility tube.

As shown in FIG. 2, the trace detection device 100 further includes a fifth three-way valve (e.g., a two-position three-way solenoid valve) 104. The fifth three-way valve 104 is located between the first pump 103A and the third purification filter 107C. A first port of the fifth three-way valve 104 is in fluid communication with the first buffer chamber 102A. A second port of the fifth three-way valve 104 is in fluid communication with the third purification filter 107C. A third port of the fifth three-way valve 104 is in fluid communication with the fourth purification filter 107D. The fifth three-way valve 104 is configured to only allow a gas to flow from the first buffer chamber 102A to the third purification filter 107C in the sample injection state and in the internal circulation state; only allow a gas to flow from the first buffer chamber 102A to the external environment in an air releasing state; and only allow a gas to flow from the external environment to the first buffer chamber 102A in an air compensating state.

In this embodiment, the ion mobility tube 101 is an integrated dual-mode full-ceramic mobility tube. The ion mobility tube 101 includes a first ion mobility tube and a second ion mobility tube. Correspondingly, the number of the mobility gas circulation gas path module VI$_1$ is two. The outlet end of each mobility gas circulation gas path module VI$_1$ is in communication with the third inlet 101C of the corresponding ion mobility tube 101. It should be noted that those skilled in the art should understand that in some other embodiments of the present disclosure, the ion mobility tube 101 may be an ion mobility tube 101 known or applicable in the art, such as a single ion mobility tube 101.

In an embodiment, the sampling tube 110 may be, for example, a stainless steel tube. An outer diameter of the sampling tube 110 does not exceed 5 mm. For example, a heater may be disposed on the sampling gas path module I to ensure that an internal temperature of the sampling gas path module I is not lower than a preset temperature, such as 50° C., so as to facilitate storage and sample injection of a pulsed sample. In addition, the inlet 110A of the sampling tube 110 may be disposed with a microporous filter device, such as a microporous filter, for filtering impurities such as dust or particles in the sample.

In this embodiment, the first three-way valve 105A and the fourth three-way valve 105D may be, for example, two-position three-way solenoid valves, so as to switch quickly under a control of, for example, a controller, so that a pulse sampling may be achieved, a time of the pulse sampling may be as low as millisecond, and the minimum sampling amount of a single pulse may be as low as a few microlitres. With such pulse sampling direct injection manner, for example, compared with a traditional semi-permeable membrane injection, the sensitivity may be greatly improved, and the influence of the harsh external detection environment on the accuracy of ion mobility detection may be minimized, so as to ensure that the ion mobility tube may work stably for a long time in a harsh on-site environment. It should be noted that the second three-way valve 105B and the third three-way valve 105C are also preferably two-position three-way solenoid valves. Of course, the first three-way valve 105A, the second three-way valve 105B, the third three-way valve 105C and the fourth three-way valve 105D may be, for example, replaced by components known or applicable in the art, such as two on-off valves.

A working process of the trace detection device 100 is as follows.

An internal circulation process: as shown in FIG. 2, the fifth three-way valve 104 is communication with the third purification filter 107C. Under an action of the first pump 103A, a gas inside the ion mobility tube 101 comes out from the outlet 101D, then flows through the first buffer chamber 102A and the fifth three-way valve 104 in sequence, reaches the second buffer chamber 102B after being filtered by the third purification filter 107C, respectively enters the mobility gas circulation gas path module VI$_1$ via the second flow control valve 106B and enters the carrier gas circulation gas path module VI$_2$ via the third flow control valve 106C, and then returns to the ion mobility tube 101.

A sampling process: as shown in FIG. 3, the sampling head 113 is placed close to a sample to be detected, the fourth three-way valve 105D and the second three-way valve 105B are connected to a 1 position, and the third three-way valve 105C is connected to a 0 position. A gas sample is driven by the second pump 103B to reach the sampling tube 110 via the sampling head 113 through the fourth three-way valve 105D, thereby completing the sampling.

A sample injection process: when the sampling is completed, the second three-way valve 105B and the fourth three-way valve 105D are quickly connected to the 0 position. A discharge gas from the ion mobility tube 101 is driven by the first pump 103A to pass through the first buffer chamber 102A, the third purification filter 107C, and the second buffer chamber 102B in sequence, enter the sampling tube 110 after being pressurized by the second pump 103B, and form a sample carrier gas containing the sample with the sample temporarily stored in the sampling tube 110. Then, the sample carrier gas enters the ion mobility tube 101 via the first branch sample injection gas path module II$_1$ (in this situation, the first three-way valve 105A is connected to the 0 position) for detection and analysis, or the sample carrier gas passes through the ion chromatography device 114 via the second branch sample injection gas path module II$_2$ for pre-separation, and then is introduced into the ion mobility tube 101 (in this situation, the first three-way valve 105A is connected to the 1 position, as shown in FIG. 4) for detection and analysis.

An air suction cleaning process: as shown in FIG. 5, the second three-way valve 105B and the fourth three-way valve 105D are connected to the 1 position, the third three-way valve 105C is connected to the 0 position, and at the same time the second pump 103B is turned on. Clean air reaches the sampling tube 110 from the sampling head 113 through the fourth three-way valve 105D, flows through the second three-way valve 105B, the third three-way valve 105C, the second pump 103B, the first purification filter 107A and the air resistance 108A in sequence, and is then discharged, so as to clean the passed pipelines and valves.

An air blowing cleaning process: as shown in FIG. 6, the second three-way valve 105B, the third three-way valve 105C and the fourth three-way valve 105D are connected to the 1 position, and the second pump 103B is turned on. Air from the external environment passes through the air resistance 108B, is purified and filtered by the second purification filter 107B, flows through the second pump 103B, the third three-way valve 105C, the second three-way valve 105B, the sampling tube 110, the fourth three-way valve 105D and the sampling head 113 in sequence, and is then discharged, so as to clean the passed pipelines and valves.

In the trace detection device provided according to the present disclosure, by switching the sample injection gas path module between the first mode and the second mode, the user may switch to the first mode (i.e., the quick detection mode) when the quick qualitative detection of the suspect is desired, and the user may switch to the second mode (i.e., the fine detection mode) when the deep judgement of the specific property of the suspect is desired. In this way, the user may select the needed detection mode as required, so as to meet various detection needs of the user. In addition, the trace detection device achieves a trace pulse sampling of the detected sample. On the one hand, a direct sample injection manner of the trace pulse sampling may improve a detection sensitivity of the instrument. On the other hand, on a premise of ensuring the same limit of detection, the amounts of sampling and sample injection of the direct sample injection manner of the trace pulse sampling are low, and even the harsh external environment is difficult to affect the performance of the instrument. Further, the trace detection device has an air suction cleaning or air blowing cleaning function, which may assist in cleaning the device and improve the work efficiency.

Those skilled in the art may understand that the embodiments described above are all exemplary, and those skilled in the art may make improvements thereto. The structures described in various embodiments may be freely combined without conflicts in structure or principle.

After the preferred embodiments of the present disclosure are described in detail, those skilled in the art may clearly understand that various changes and modifications may be made without departing from the scope and spirit of the appended claims, and the present disclosure is also not limited by the implementations of the exemplary embodiments set forth in the description.

What is claimed is:

1. A trace detection device, comprising:
an ion mobility tube configured to detect a sample;
a sampling gas path module configured to collect the sample;
a sample injection gas path module configured to introduce a sample carrier gas containing the sample collected by the sampling gas path module toward the ion mobility tube; and
a gas chromatography apparatus capable of pre-separating the sample carrier gas, so as to form a pre-separated sample carrier gas;
wherein the sample injection gas path module is further configured to be capable of switching between a first mode and a second mode, wherein in the first mode, the sample injection gas path module introduces the sample carrier gas into the ion mobility tube; and in the second mode, the sample injection gas path module introduces the sample carrier gas into the gas chromatography apparatus to pre-separate the sample carrier gas, wherein the pre-separated sample carrier gas is introduced into the ion mobility tube,
wherein the sample injection gas path module comprises a main sample injection gas path module as well as a first branch sample injection gas path module and a second branch sample injection gas path module in parallel connection, the first branch sample injection gas path module and the second branch sample injection gas path module in parallel connection are connected with the main sample injection gas path module in series, and the gas chromatography apparatus is disposed on the second branch sample injection gas path module; and
wherein the trace detection device further comprises a first three-way valve, a first port of the first three-way valve is in fluid communication with the main sample injection gas path module, a second port of the first three-way valve is in fluid communication with the first branch sample injection gas path module, a third port of the first three-way valve is in fluid communication with the second branch sample injection gas path module, and the first three-way valve is configured to only allow the sample carrier gas to flow from the main sample injection gas path module to the first branch sample injection gas path module in the first mode, and only allow the sample carrier gas to flow from the main sample injection gas path module to the second branch sample injection gas path module in the second mode.

2. The trace detection device according to claim 1, further comprising a pressurized gas path module configured to introduce a pressurized gas to an upstream side of the second branch sample injection gas path module.

3. The trace detection device according to claim 2, wherein an inlet end of the pressurized gas path module is in fluid communication with a portion of the main sample injection gas path module located on an upstream side of the sampling gas path module, so as to receive a gas from the main sample injection gas path module for use as the pressurized gas.

4. The trace detection device according to claim 2, further comprising a pump for driving a discharge gas from the ion mobility tube into the pressurized gas path module.

5. The trace detection device according to claim 1, wherein the sampling gas path module comprises a sampling head and a sampling tube, the trace detection device further comprises a fourth three-way valve, a first port of the fourth three-way valve is in fluid communication with an inlet of the sampling tube, a second port of the fourth three-way valve is in fluid communication with the main sample injection gas path module, a third port of the fourth three-way valve is in fluid communication with the sampling head, and the fourth three-way valve is configured to only allow a gas to flow from the sampling head to the sampling tube in a sampling state, and only allow a gas to flow from the main sample injection gas path module to the sampling tube in a sample injection state.

6. The trace detection device according to claim 5, wherein the fourth three-way valve and the first three-way valve are two-position three-way solenoid valves.

7. The trace detection device according to claim 5, wherein the sampling head comprises a needle shape and a suction cup shape.

8. The trace detection device according to claim 5, further comprising an air suction cleaning gas path module, wherein an inlet end of the air suction cleaning gas path module is in fluid communication with an outlet of the sampling tube, an outlet end of the air suction cleaning gas path module is in fluid communication with an external environment, a first purification filter is disposed on the air suction cleaning gas path module, and the air suction cleaning gas path module is configured to suck air in the external environment in an air suction cleaning state, the air passing through the sampling head and the sampling tube in sequence, followed by being filtered by the first purification filter and being discharged.

9. The trace detection device according to claim 8, further comprising an air blowing cleaning gas path module, wherein an inlet end of the air blowing cleaning gas path module is in fluid communication with the external environment, an outlet end of the air blowing cleaning gas path module is in fluid communication with the outlet of the sampling tube, a second purification filter is disposed on the air blowing cleaning gas path module, and the air blowing cleaning gas path module is configured to make, in an air blowing cleaning state, the air from the external environment pass through the sampling tube and the sampling head in sequence after being filtered by the second purification filter, followed by being discharged.

10. The trace detection device according to claim 9, further comprising a second three-way valve, a first port of the second three-way valve is in fluid communication with the outlet of the sampling tube, a second port of the second three-way valve is in fluid communication with the main sample injection gas path module, a third port of the second three-way valve is in fluid communication with the inlet end of the air suction cleaning gas path module and the outlet end of the air blowing cleaning gas path module, and the second three-way valve is configured to only allow a gas to flow from the sampling tube to the air suction cleaning gas path module in the air suction cleaning state or only allow a gas to flow from the air blowing cleaning gas path module to the sampling tube in the air blowing cleaning state, and only allow a gas to flow from the sampling tube to the main sample injection gas path module in the sample injection state.

11. The trace detection device according to claim 10, further comprising a third three-way valve, wherein a first port of the third three-way valve is in fluid communication with the second port of the second three-way valve, a second port of the third three-way valve is in fluid communication with an inlet end of the first purification filter, a third port of the third three-way valve is in fluid communication with an outlet end of the second purification filter, and the third three-way valve is configured to only allow a gas from the sampling tube to flow to the first purification filter in the air suction cleaning state, and only allow a gas to flow from the second purification filter to the sampling tube in the air blowing cleaning state.

12. The trace detection device according to claim 1, further comprising a circulation gas path module, wherein the circulation gas path module comprises a mobility gas circulation gas path module and a carrier gas circulation gas path module, an inlet end of the mobility gas circulation gas path module is in fluid communication with a gas outlet of the ion mobility tube, an outlet end of the mobility gas circulation gas path module is in fluid communication with a third inlet of the ion mobility tube for introducing a mobility gas into the ion mobility tube, an inlet end of the carrier gas circulation gas path module is in fluid communication with the gas outlet of the ion mobility tube, and an outlet end of the carrier gas circulation gas path module is in fluid communication with a second inlet of the ion mobility tube for introducing a carrier gas into the ion mobility tube.

13. The trace detection device according to claim 12, wherein a flow control valve is disposed on the mobility gas circulation gas path module for controlling a gas flow on the mobility gas circulation gas path module; and a flow control valve is also disposed on the carrier gas circulation gas path module for controlling a gas flow on the carrier gas circulation gas path module.

14. The trace detection device according to claim 12, further comprising a calibration gas path module, wherein one end of the calibration gas path module is in fluid communication with the carrier gas circulation gas path module; a calibration object box is disposed on the other end of the calibration gas path module, and the calibration object box is configured to accommodate a calibration object; and an on-off valve is further disposed on the calibration gas path module, and the on-off valve is configured to control an on-off of the calibration gas path module, so that in a calibration state, the carrier gas in the carrier gas circulation gas path module introduces a calibration object permeated from the calibration object box into the ion mobility tube to acquire calibration data.

* * * * *